United States Patent Office 3,417,083
Patented Dec. 17, 1968

3,417,083
POLYMETHINE PYRYLIUM COMPOUNDS AND
PROCESS FOR THEIR PREPARATION
George A. Reynolds and James A. Van Allan, Rochester, N.Y., assignors to Eastman Kodak Company, Rochester, N.Y., a corporation of New Jersey
No Drawing. Filed Sept. 27, 1965, Ser. No. 490,626
16 Claims. (Cl. 260—240)

This invention relates to new polymethine pyrylium compounds and to processes for their preparation. The invention is particularly directed to new polymethine compounds containing a 1,2,3,4-tetrahydrobenzopyrylium nucleus and to processes for their preparation.

It is known that polymethine cyanine dyes containing three or five methine groups in the chain linking the heterocyclic nuclei have absorption maxima in the longer wavelengths of the visible region of the spectrum. It is also known that the corresponding polymethine dye compounds wherein the ends of the methine chain are terminated with heterocyclic pyrylium nuclei have increased absorption maxima. For example, R. Wizinger, Angewandte Chem., 51, 895 (1938), reports the following absorption maxima for the similar polymethine structures shown below.

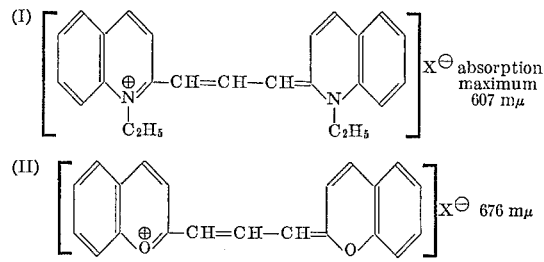

For the following two dyes, the dye containing the pyrylium nuclei exhibits a bathochromic shift of 110 mµ beyond the absorption maximum of the corresponding pyridinium dye.

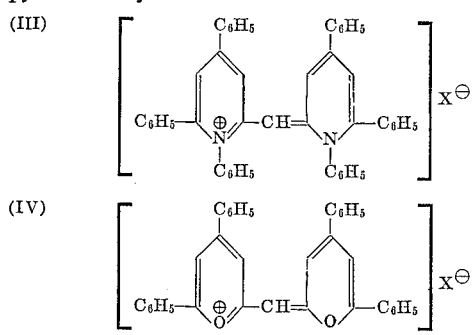

Likewise, for the following two dyes, a similar shift of 160 mµ occurs.

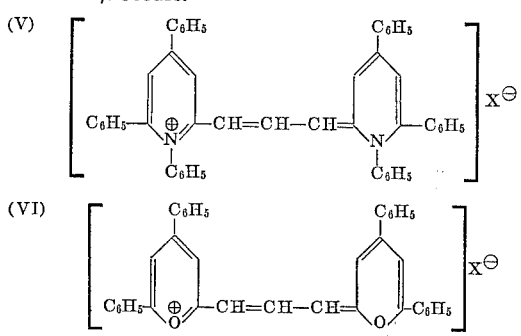

$X^\ominus$ in the foregoing formulas stands for an anion.

Wizinger cites several other examples and shows that, in each case, the polymethine dyes containing pyrylium nuclei absorb at longer wavelengths than the corresponding dyes containing pyridinium nuclei.

For most purposes stability to heat and light are important qualities of a dye. The stability of the known polymethine dyes, such as, for example, the polymethine cyanine dyes, to heat and light is inadequate for many applications. Thus, there is a need for stable dyes which absorb strongly in the infrared region of the spectrum.

It is an object of our invention to provide stable new polymethine dyes which absorb strongly in the infrared region of the spectrum.

Another object of our invention is to provide new polymethine dyes which have good stability to heat and light.

A further object of our invention is to provide new polymethine dyes which absorb strongly in the infrared region of the spectrum and which have good stability to heat and light.

Another object of our invention is to provide a process for the preparation of the new polymethine compounds of our invention.

Other objects will be apparent from the consideration of the following description and examples.

We have discovered new polymethine pyrylium compounds that exhibit an unexpectedly large bathochromic shift beyond the absorption maxima of the known corresponding polymethine dye compounds such as the polymethine cyanine dyes, for example. Additionally, the new polymethine pyrylium compounds of our invention have good stability to heat and light. Their stability to heat and light is much superior to that of the known corresponding polymethine dyes such as the polymethine cyanine dyes, for example and, so far as we are aware, this fact could not have been predicted. The properties of the new polymethine pyrylium compounds of the invention make them useful for purposes that the known corresponding polymethine dye compounds are definitely inferior or unsuitable.

The new pyrylium compounds of our invention for the most part have the formula:

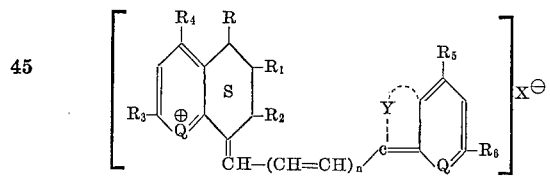

wherein Q and $Q_1$ each represents the same or different member selected from the group consisting of oxygen and sulfur, $n$ represents a whole number selected from 1 and 2, R, $R_1$ and $R_2$ each represents a member selected from the group consisting of hydrogen, an alkyl group having 1 to 4 carbon atoms, an alkoxy group having 1 to 4 carbon atoms and a phenyl nucleus, $R_3$, $R_4$, $R_5$ and $R_6$ each represents a phenyl nucleus, Y represents the necessary atoms to complete a cyclopentenyl or a cyclohexenyl ring and wherein said cyclohexenyl ring can be substituted with an alkyl group having 1 to 4 carbon atoms, an alkoxy group having 1 to 4 carbon atoms, and a phenyl nucleus, $X^\ominus$ represents a strong anion and S means that the ring in which it apepars is saturated.

Methyl, ethyl, propyl, isopropyl, butyl, isobutyl, and tertiarybutyl are illustrative of the alkyl groups represented by R, $R_1$ and $R_2$ and of the alkyl groups which can be attached to the cyclohexenyl ring.

Methoxy, ethoxy, propoxy, isopropoxy, butoxy and isobutoxy are illustrative of the alkoxy groups represented by R, $R_1$ and $R_2$ and of the alkoxy groups which can be attached to the cyclohexenyl ring.

The expression "a phenyl nucleus" includes phenyl as well as substituted phenyl nuclei. Substituted phenyl nuclei include, for example, o-, m- or p-chlorophenyl, o-, m- or p-alkylphenyl radicals, such as o-, m- or p-methylphenyl, o-, m- or p-ethylphenyl, o-, m- or p-alkoxyphenyl radicals such as o-, m- or p-methoxyphenyl, o-, m- or p-ethoxyphenyl, o-pentyloxyphenyl, m-pentyloxyphenyl or p-pentyloxyphenyl phenyl radicals substituted with the amino group, phenyl radicals substituted with a hydroxy group and phenyl radicals substituted with the amido ($-CONH_2$) group.

The anion present in the new pyrylium compounds of our invention must be the anion of a strong acid. The perchlorate, fluoroborate, chloride, bromide, fluoride, iodide, sulfate, chloroaluminate, chloroferrate and p-toluenesulfonate anions are illustrative of the anions that can be present in the new pyrylium compounds of our invention.

The new pyrylium compounds of our invention having 3 and 5 carbon atoms in the chain linking the two heterocyclic nuclei embrace symmetrical and unsymmetrical compounds. The symmetrical compounds wherein Q and $Q_1$ each represent oxygen and $n$ is 2 are prepared by reacting a 5,6,7,8-tetrahydrobenzopyrylium salt containing a phenyl nucleus in the 2- and 4-positions with 1-anilino-5-phenylimino-1,3-pentadiene hydrochloride (glutaconaldehyde dianil hydrochloride).

The preparation of other symmetrical compounds of our invention is illustrated by the reaction between benzo[a]-8,9,10,11-tetrahydroxanthylium perchlorate and glutaconaldehyde dianil hydrochloride described in Example 2 to prepare 8-[5-(9,10-dihydro-11H-benzo[a]xanthene-8-yl) - 2,4 - pentadienylidene]-8,9,10,11-tetrahydrobenzeno[a]xanthylyum perchlorate.

Attempts to prepare pyrylium polymethine dyes by the reaction sequence described in the two preceding paragraphs failed when the pyrylium nuclei did not have a fused saturated ring attached. For example, 2,4-diphenyl-6-methylpyrylium perchlorate, alkyl substituted benzo[b] pyrylium salts and alkyl naphthopyrylium salts respectively, gave no dyes when reacted with glutaconaldehyde dianil hydrochloride.

The reaction sequence just described yields the corresponding symmetrical compounds wherein the chain linking the two heterocyclic nuclei contains 3 carbon atoms by using 1,3,3-trimethoxy-1-propene in place of glutaconaldeyhde dianil hydrochloride. This reaction is illustrated in Example 13.

The unsymmetrical compounds of our invention can be prepared by using a two-step reaction sequence. In the first step, equimolar amounts of a pyrylium salt containing a fused, saturated ring and a compound having the structure $$[C_6H_5NH^{\oplus}=CH-(CH=CH)_mNHC_6H_5]Cl^{\ominus}$$

where $m$ is 1 or 2, are reacted to form an intermediate having only one terminal pyrylium fused ring structure on the methine chain. The saturated fused ring seems to stabilize the pyrylium ring in this intermediate. The intermediate can then be reacted either with another fused ring pyrylium salt or with a pyrylium salt having an active methyl group, rather than a fused ring, to obtain the unsymmetrical compounds. The reaction sequence just described is illusrtated in several of the examples, such as Examples 4, 8, 10 and 12, for example.

The thiapyrylium dye compounds of our invention are prepared in the same manner as the pyrylium dye compounds of our invention using thiapyrylium salts instead of pyrylium salts. Example 11 illustrates the preparation of a symmetrical thiapyrylium dye compound of our invention.

The following examples illustrate the new polymethine compounds of the invention and the processes for preparing them.

Example 1.—Preparation of 8-[5-(6,7-dihydro-2,4-diphenyl - 5H - 1-benzopyran-8-yl)-2,4-pentadienylidene]-5,6,7,8 - tetrahydro - 2,4-diphenyl-1-benzopyrylium perchlorate

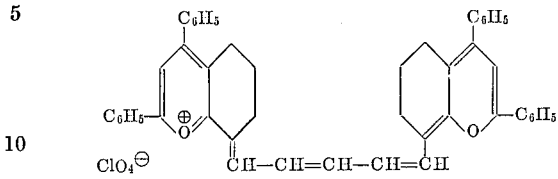

A mixture of 3.9 g. of 2,4-diphenyl-5,6,7,8-tetra-hydrobenzo[b] pyrylium perchlorate, 1.4 g. of glutaconaldehyde dianil hydrochloride, 0.8 g. of sodium acetate and 100 ml. of acetic anhydride was refluxed for ten minutes. After chilling, the solid was collected and mixed with boiling acetonitrile. The resulting hot mixture was filtered to yield 2.4 g. of the desired compound as a brown solid melting at 260° C.

Analysis.—Calcd. for $C_{47}H_{39}ClO_6$: C, 76.9; H, 5.3; Cl, 4.8. Found: C, 76.8; H, 5.2; Cl, 4.8.

Example 2.—Preparation of 8-[5-(9,10-dihydro-11H-benzo[a] - xanthene-8-yl)-2,4-penta-dienylidene]8,9,10-11-tetrahydrobenzo[a]xanthylyum perchlorate

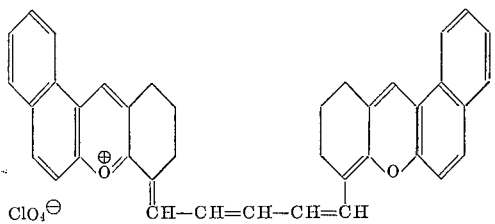

A mixture of 3.4 g. of benzo[a]-8,9,10,11-tetrahydroxanthylium perchlorate, 1.4 g. of glutaconaldehyde dianil hydrochloride, 0.8 g. of sodium acetate and 100 ml. of acetate anhydride was refluxed for ten minutes. The solid was collected, washed with water and then with acetone to give 2.1 g. of the desired compound as a brown solid melting at 240° C.

Analysis.—Calcd. for $C_{39}H_{31}ClO_6$: C, 74.3; H, 4.9; Cl 5.6. Found: C, 74.7; H, 5.2; Cl. 5.6.

Example 3.—Preparation of 8-[6-(4,6-diphenyl-2H-pyran-2 - ylidene) - 2,4-hexadienylidene]-5,6,7,8-tetrahydro-2,4-diphenyl-1-benzopyrylium perchlorate

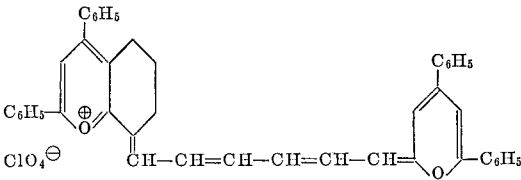

A mixture of 2.0 g. of 2,4-diphenyl-5,6,7,8-tetrahydrobenzopyrylium perchlorate and 1.4 g. of 1-anilino-5-phenylimino-1,3-pentadienehydrochloride in 25 ml. of acetic anhydride was refluxed for 15 minutes. The blue solution was cooled a few degrees below boiling and 1.8 g. of 6-methyl-2,4-diphenylpyrylium perchlorate and 0.5 g. of sodium acetate were added. The reaction mixture was refluxed until the blue color disappeared, chilled, and the solid reaction product was collected and mixed with boiling acetonitrile to dissolve impurities therefrom. The hot mixture was filtered to recover the desired product as a solid melting at 248° C.

Analysis.—Calcd. for $C_{44}H_{35}ClO_6$: C, 76.2; H, 5.1; Cl, 5.1. Found: C, 75.9; H, 5.2; Cl, 4.8.

Example 4.—Preparation of 8-[5-(5,6-dihydro-2,4-diphenylcyclopenta[b]pyran - 7 - yl) - 2,4 - pentadienylidene] - 5,6,7,8 - tetrahydro-2,4-diphenyl-1-benzopyrylium perchlorate

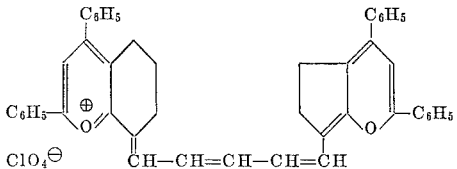

A mixture of 2.0 g. of 2,4-diphenyl-5,6,7,8-tetrahydrobenzopyrylium perchlorate and 1.4 g. of 1-anilino-5-phenylimino-1,3-pentadienehydrochloride in 25 ml. of acetic anhydride was refluxed for 15 minutes. The blue solution was cooled a few degrees below boiling and 1.9 g. of 2,4 - diphenyl-6,7-dihydro-5H-cyclopenta[b]pyrylium perchlorate

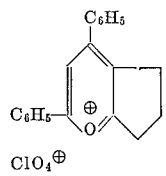

and 0.5 g. of sodium acetate were added. The reaction mixture was refluxed until the blue color disappeared, chilled, and the solid reaction product was collected and mixed with boiling acetonitrile to dissolve impurities therefrom. The hot mixture was filtered to recover the desired product as a solid melting at 255° C.

*Analysis.*—Calcd. for $C_{46}H_{37}ClO_6$: C, 76.7; H, 5.1; Cl, 4.9. Found: C, 76.4; H, 5.2; Cl, 4.8.

Example 5.—Preparation of 8-[5-(6,7,-dihydro-6-methyl-2,4 - diphenyl - 5H-1-benzopyran-8-yl)-2,4-pentadienylidene] - 5,6,7,8 - tetrahydro - 6 - methyl-2,4-diphenyl-1-benzopyrylium perchlorate

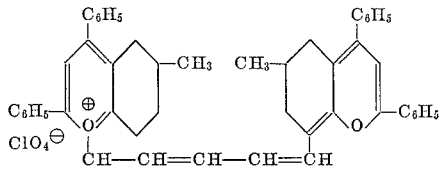

A mixture of 4.0 g. of 2,4-diphenyl-6-methyl-5,6,7,8-tetrahydrobenzopyrylium perchlorate, 1.4 g. of 1-anilino-5-phenylimino-1,3-pentadienehydrochloride, 0.8 g. of sodium acetate and 100 ml. of acetic anhydride was refluxed for ten minutes, chilled, and the solid reaction product was collected and mixed with boiling acetonitrile. The hot mixture was filtered to recover the desired product as a known solid metling at 241–243° C.

*Analysis.*—Calcd. for $C_{49}H_{42}ClO_6$: C, 77.1; H, 5.7; Cl, 4.6. Found: C, 77.1; H, 6.0; Cl, 4.5.

Example 6.—Preparation of 8-[5-(6-cyclohexyl-6,7-dihydro - 2,4 - diphenyl - 5H-1-benzopyran-8-yl)-2,4-pentadienylidene] - 6 - cyclohexyl - 5,6,7,8-tetrahydro-2,4-diphenyl-1-benzopyrylium perchlorate

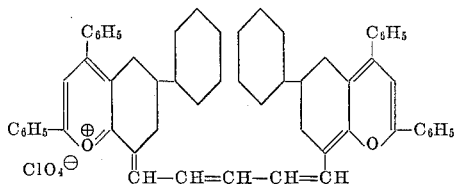

A mixture of 4.5 g. of 6-cyclohexyl-2,4-diphenyl-5,6,7,8-tetrahydrobenzopyrylium perchlorate, 1.4 g. of 1-anilino-5-phenylimino-1,3-pentadienehydrochloride, 0.8 g. of sodium acetate and 100 ml. of acetic anhydride was refluxed for ten minutes, chilled, and the solid reaction product was collected and mixed with boiling acetonitrile. The hot mixture was filtered to recover the desired product as a solid melting at 242° C.

*Analysis.*—Calcd. for $C_{59}H_{59}ClO_6$: C, 78.7; H, 6.6; Cl, 3.9. Found: C, 78.4; H, 6.8; Cl, 4.0.

Example 7.—Preparation of 8-5-[2,4-di(4-pentyloxyphenyl)-6,7-dihydro - 5H - 1 - benzopyran-8-yl]-2,4-pentadienylidene-2,4-di(4-pentyloxyphenyl) - 5,6,7,8 - tetrahydro-1-benzopyrylium perchlorate

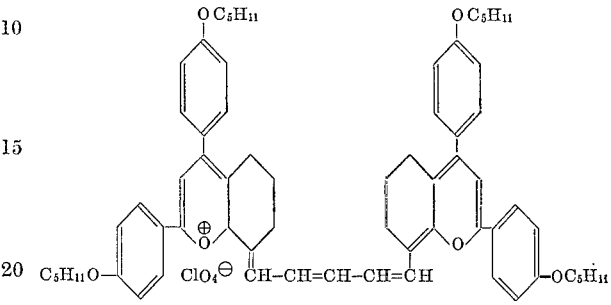

A mixture of 5.58 g. of 2,4-di(4-pentyloxyphenyl)-5,6,7,8-tetrahydrobenzopyrylium perchlorate, 1.4 g. of 1-anilino-5-phenylimino-1,3-pentadienehydrochloride, 0.8 g. of sodium acetate and 100 ml. of acetic anhydride was refluxed for ten minutes, chilled, and the solid reaction product was collected and mixed with boiling acetonitrile. The hot mixture was filtered to recover the desired product as a solid melting at 200–201° C.

*Analysis.*—Calcd. for $C_{67}H_{70}ClO_{10}$: C, 74.6; H, 7.3. Found: C, 74.2; H, 7.0.

Example 8.—Preparation of 8-5-[2,4-di)4-pentyloxyphenyl)-6,7-dihydro - 5H - 1 - benzo-pyran-8-yl]-2,4-pentadienylidene-5,6,7,8-tetrahydro - 2,4 - diphenyl-1-benzopyrylium perchlorate

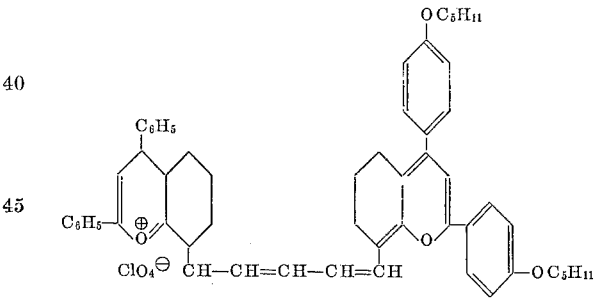

A mixture of 2.0 g. of 2,4-diphenyl-5,6,7,8-tetrahydrobenzopyrylium perchlorate and 1.4 g. of 1-anilino-5-phenylimino-1,3-pentadienehydrochloride in 25 ml. of acetic anhydride was refluxed for 15 minutes. The blue solution was cooled a few degrees below boiling and 3.0 g. of 2,4-di(4-pentyloxyphenyl)-5,6,7,8-tetrahydrobenzopyrylium perchlorate and 0.5 g. of sodium acetate were added. The reaction mixture was refluxed until the blue color disappeared, chilled, and the solid reaction product was collected and mixed with boiling acetonitrile to dissolve impurities therefrom. The hot mixture was filtered to recover the desired product as a solid melting at 243–244° C.

*Analysis.*—Calcd. for $C_{57}H_{59}ClO_8$: C, 74.8; H, 6.5. Found: C, 74.9; H, 6.7.

Example 9.—Preparation of 8-[5-(6-tert-butyl-6,7-dihydro-2,4-diphenyl - 5H - 1 - benzopyran-8-yl)-2,4-pentadienylidene]-6-tert-butyl - 5,6,7,8 - tetrahydro - 2,4 - diphenyl-1-benzopyrylium perchlorate A mixture of 4.2 g. of 2,4-diphenyl-6-tert-butyl-5,6,7,8-tetrahydrobenzopyrylium perchlorate, 1.4 g. of 1-anilino-5-phenylimino-1,3-pentadienehydrochloride, 0.8 g. of sodium acetate and 100 ml. of acetic anhydride was refluxed for ten minutes, chilled and the solid reaction product was collected and mixed with boiling acetonitrile. The hot mixture was filtered to recover the desired product as a solid melting at 234° C.

*Analysis.*—Calcd. for $C_{55}H_{55}ClO_6$: C, 77.9; H, 6.5; Cl, 4.2. Found: C, 78.1; H, 6.4; Cl, 4.1.

Example 10.—Preparation of 8-[5-(6-cyclohexyl-6,7-dihydro-2,4-diphenyl - 5H - 1 - benzopyran-8-yl)-2,4-pentadienylidene] - 2,4 - di(4 - pentyloxyphenyl - 5,6,7,8-tetrahydro-1-benzopyrylium perchlorate A mixture of 2.8 g. of 2,4-di(4-pentyloxyphenyl)-5,6,7,8-tetrahydrobenzopyrylium perchlorate and 1.4 g. of 1-anilino-5-phenylimino-1,3-pentadienehydrochloride in 25 ml. of acetic anhydride was refluxed for 15 minutes. The blue solution was cooled a few degrees below boiling and 2.3 g. of 6-cyclohexyl-2,4-diphenyl-5,6,7,8-tetrahydrobenzopyrylium perchlorate and 0.5 g. of sodium acetate were added. The reaction mixture was refluxed until the blue color disappeared, chilled, and the solid reaction product was collected and mixed with boiling acetonitrile to dissolve impurities therefrom. The hot mixture was filtered to recover the desired product as a solid melting at 203–204° C.

*Analysis.*—Calcd. for $C_{36}H_{67}ClO_8$: C, 76.4; H, 6.8. Found: C, 76.1; H, 6.5.

Example 11.—Preparation of 8-[5-(6,7-dihydro-2,4-diphenyl - 5H - 1 - benzothiopyran-8-yl)-2,4-pentadienylidene]-pyrylium perchlorate

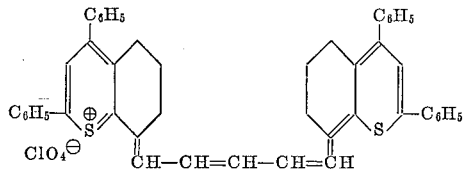

Part A.—To a suspension of 10 g. of 2,4-diphenyl-5,6,7,8-tetrahydrobenzo[b]pyrylium perchlorate in 200 ml. of acetone was added a solution of 10 g. of sodium sulfide in 75 ml. of water. The solution was stirred for 15 minutes and the reaction mixture was made strongly acidic with 20 percent perchloric acid. Stirring was continued for another hour. The solid was collected by filtration, washed with water and recrystallized from ethanol to give 8 g. of 2,4-diphenyl-5,6,7,8-tetrahydrobenzo[b]thiapyrylium perchlorate, melting at 168–169° C.

*Analysis.*—Calcd. for $C_{21}H_{10}ClO_4S$: C, 62.7; H, 4.7; S, 8.0. Found: C, 62.6; H, 4.5; S, 7.8.

Part B.—A mixture of 0.5 g. of the thiapyrylium salt prepared in Part A, 0.35 g. of 1-anilino-5-phenylimino-1,3-pentadienehydrochloride and 15 ml. of acetic anhydride was refluxed for 15 minutes. The blue solution was cooled slightly and 0.5 g. more of the thiapyrylium salt and 0.2 g. of sodium acetate were added. The color of the reaction mixture immediately changed to brown. The reaction mixture was chilled and the brown solid reaction product was collected on a funnel, washed with water, and then with ethanol to yield 0.5 g. of the desired product melting at 247° C. with decomposition.

*Analysis.*—Calcd. for $C_{47}H_{39}ClO_4S_2$: C, 73.4; H, 5.1; S, 8.3. Found: C, 73.2; H, 5.3; S, 8.1.

Example 12.—Preparation of 8-[5-(6,7-dihydro-2,4-diphenyl-5H-1-benzopyran-8-yl) - 2,4-pentadienylidene]-5,6,7,8-tetrahydro - 2,4 - diphenyl-1-benzothiapyrylium perchlorate

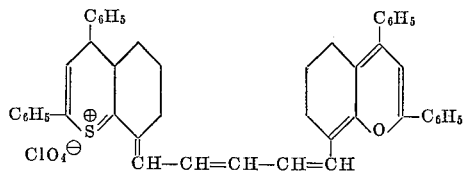

A mixture of 1.9 g. of 2,4-diphenyl-5,6,7,8-tetrahydrobenzopyrylium perchlorate, 1.4 g. of 1-anilino-5-phenyl- imino-1,3-pentadienehydrochloride and 25 ml. of acetic anhydride was refluxed for 15 minutes. The blue solution was cooled slightly and 2 g. of the thiapyrylium salt prepared in Part A of Example 11 and 0.5 g. of sodium acetate were added. After mixing thoroughly, the reaction mixture was chilled and the yellow-brown solid product was collected, washed with water, and then with ethanol to yield 1.7 g. of product melting at 249° C.

*Analysis.*—Calcd. for $C_{47}H_{39}ClO_5S$: C, 75.2; H, 5.2; S, 4.3. Found: C, 75.3; H, 5.4; S, 4.0.

Example 13.—Preparation of 8-[3-(6,7-dihydro-2,4-diphenyl-5H-1-benzopyran-8-yl) - 2 - propylidene]-5,6,7,8-tetrahydro-2,4-diphenyl-1 - benzopyrylium perchlorate

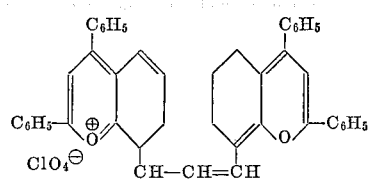

A mixture of 4 g. of 2,4-diphenyl-5,6,7,8-tetrahydrobenzopyrylium perchlorate, 5 ml. of 1,3,3-trimethoxy-1-propene, 50 ml. of acetic anhydride, 25 ml. of acetic acid and 5 ml. of pyridine was refluxed for 30 minutes. The reaction mixture was chilled and the desired product which precipitated was recovered by filtration, washed with ethyl alcohol and then with water to give 1.8 g. of a black crystalline solid melting at 243° C.

*Analysis.*—Calcd. for $C_{45}H_{37}ClO_6$: C, 76.3; H, 5.3; Cl, 5.0. Found: C, 76.0; H, 5.3; Cl, 5.1.

Following the teachings described hereinbefore and illustrated in Example 13 the compounds set forth hereinafter are readily prepared.

(14) 8-[3-(9,10-dihydro - 11H - benzo[a]xanthene-8-yl) - 2 - propylidene] - 8,9,10,11 - tetrahydrobenzo[a]xanthylyum perchlorate.

(15) 8-[3-(5,6-dihydro-2,4-diphenylcyclopenta[b]pyran-7-yl)-2-propylidene] - 5,6,7,8 - tetrahydro - 2,4-diphenyl-1-benzopyrylium perchlorate.

(16) 8-[3-(6,7-dihydro-6 - methyl-2,4-diphenyl-5H-1-benzopyran-8-yl)-2 - propylidene] - 5,6,7,8-tetrahydro-6-methyl-2,4-diphenyl-1-benzopyrylium perchlorate.

(17) 8-[-3-(6-cyclohexyl-6,7-dihydro - 2,4 - diphenyl-5H-1-benzopyran-8-yl)-2-propylidene]-6-cyclohexyl - 5,6,7,8-tetrahydro-2,4-diphenyl - 1 - benzopyrylium perchlorate.

(18) 8-3-[2,4-di(4-pentyloxyphenyl) - 6,7-dihydro-5H-1-benzopyran-8-yl]-2 - propylidene - 2,4-di(4-pentyloxyphenyl)-5,6,7,8-tetrahydro-1-benzopyrylium perchlorate.

(19) 8-3-[2,4-di(4-pentyloxyphenyl)-6,7-dihydro - 5H-1-benzopyran-8-yl]-2-propylidene - 5,6,7,8-tetrahydro-2,4-diphenyl-1-benzopyrylium perchlorate.

(20) 8-[3-(6-tert-butyl-6,7 - dihydro-2,4-diphenyl-5H-1-benzopyran-8-yl)-2-propylidene]-6-tert - butyl - 5,6,7,8-tetrahydro-2,4-diphenyl-1-benzopyrylium perchlorate.

(21) 8-[3-(6-cyclohexyl - 6,7-dihydro-2,4-diphenyl-5H-1-benzopyran-8-yl)-2-propylidene] - 2,4 - di(4-pentyloxyphenyl)-5,6,7,8-tetrahydro-1-benzopyrylium perchlorate.

(22) 8-[3-(6,7-dihydro-2,4-diphenyl - 5H-1-benzothiopyran-8-yl)-2-propylidene]-5,6,7,8 - tetrahydro - 2,4-diphenyl-1-benzothiapyrylium perchlorate.

(23) 8-[3-(6,7-dihydro-2,4-diphenyl - 5H-1-benzopyran-8-yl)-2 - propylidene]-5,6,7,8 - tetrahydro - 2,4-diphenyl-1-benzothiapyrylium perchlorate.

The preparation of the pyrylium salts used in the preparation of the new pyrylium dye compounds of our invention will be apparent from the following examples and other examples given hereinbefore. The procedure employed is described in Helv. Chim. Acta., 44, pp. 1766–1783 (1961).

Example 24.—Preparation of 2,4-diphenyl-5,6,7,8-tetrahydrobenzopyrylium perchlorate A solution of 35 g. of chalcone in 150 ml. of ether was cooled in an ice bath, and 70 g. of 70 percent perchloric acid was added with stirring. To this mixture was added 110 ml. of acetic anhydride over a period of 0.5 hour with stirring and cooling. After the exothermic reaction had subsided, 18 g. of cyclohexanone was added and the reaction mixture allowed to warm to room temperature and stirred for an additional 2 hours. The pyrylium salt was collected and recrystallized from methanol to yield 16 g. (25 percent) of product melting at 210° C.

*Analysis.*—Calcd. for $C_{21}H_{19}ClO_5$: C, 65.2; H, 4.9; Cl, 9.1. Found: C, 65.1; H, 5.1; Cl, 9.0.

Example 25.—Preparation of 2,4-diphenyl-5,6-cyclopentylpyrylium perchlorate

Prepared by the method described in Example 24 using an equivalent amount of cyclopentanone in place of cyclohexanone. The product was recrystallized from acetic acid and melted at 253°–254° C.

*Analysis.*—Calcd. for $C_{20}H_{17}ClO_5$: C, 64.5; H, 4.6; Cl, 9.4. Found: C, 64.7; H, 4.5; Cl, 9.2.

Example 26.—Preparation of 6-tert-butyl-2,4-diphenyl-5,6,7,8-tetrahydrobenzo[b]pyrylium perchlorate Prepared by the method described in Example 24 using an equivalent amount of 4-tert.butylcyclohexanone in place of cyclohexanone. The product was recrystallized from ethanol and melted at 231–232° C.

*Analysis.*—Calcd. for $C_{25}H_{27}ClO_5$: C, 68.0; H, 6.2; Cl, 8.0. Found: C, 67.9; H, 6.4; Cl, 7.8.

Example 27.—Preparation of 6-cyclohexyl-2,4-diphenyl-5,6,7,8-tetrahydrobenzo[b]pyrylium perchlorate Prepared by the method described in Example 24 using an equivalent amount of 4-cyclohexylcyclohexanone in place of cyclohexanone. The product was recrystallized from acetic acid and melted at 216–218° C.

*Analysis.*—Calcd. for $C_{27}H_{29}ClO_5$: C, 69.1; H, 6.2; Cl, 7.6. Found: C, 68.9; H, 6.3; Cl, 7.6.

Example 28.—Preparation of 6-ethyl-2,4-diphenyl-5,6,7,8-tetrahydrobenzo[b]pyrylium perchlorate Prepared by the method described in Example 24 using an equivalent amount of 4-ethylcyclohexanone in place of cyclohexanone. The product was recrystallized from acetic acid and melted at 226–227° C.

*Analysis.*—Calcd. for $C_{23}H_{22}ClO_5$: C, 66.8; H, 5.3; Cl, 8.5. Found C, 66.7; H, 5.6; Cl, 8.5.

Example 29.—Preparation of 6-methyl-2,4-diphenyl-5,6,7,8-tetrahydrobenzo[b]pyrylium perchlorate Prepared by the method described in Example 24 using an equivalent amount of 4-methylcyclohexanone in place of cyclohexanone. The product was recrystallized from acetic acid to give the product which melted at 207–208° C.

*Analysis.*—Calcd. for $C_{22}H_{20}ClO_5$: C, 66.2; H, 5.0; Cl, 8.8. Found: C, 66.0; H, 5.2; Cl, 8.7.

Example 30.—Preparation of 2,4-bis(4-amyloxyphenyl)-5,6,7,8-tetrahydrobenzo[b]pyrylium perchlorate Prepared by the procedure of Example 24 using an equivalent amount of 4-amyloxy-4'-amyloxychalcone in place of chalcone. The product was recrystallized from acetic acid and melted at 99–100° C.

*Analysis.*—Calcd. for $C_{31}H_{39}ClO_7$: C, 66.6; H, 7.0; Cl, 6.3. Found: C, 66.4; H, 7.0; Cl, 6.4.

The data given in the following table demonstrates the long wavelength absorption of these materials in acetonitrile solution.

| Compound of Example No.: | Absorption m$\mu$ |
|---|---|
| 1 | 1026 |
| 2 | 970 |
| 3 | 1029 |
| 4 | 1042 |
| 5 | 1026 |
| 6 | 1032 |
| 7 | 1062 |
| 8 | 1040 |
| 9 | 1028 |
| 10 | 1038 |
| 11 | 1028 |
| 12 | 1028 |
| 13 | 925 |

The new dye compounds of our invention have unusually good light stability. Normally, the known polymethine dyes, such as the polymethine cyanine dyes, will decompose even at room temperature and will discolor upon exposure to light. Our dye compounds are not decomposed on heating for 3 days at 150° C. and have been exposed to room light for extended periods without charge.

Because of their properties all the dye compounds of our invention are useful as Q-switches for lasers. The dye compounds of Examples 1, 5 and 7, for example, are very effective as Q-switches in neodymium lasers being employed in solution in chlorobenzene, for example. Their manner of use in lasers is well known to those skilled in the laser art.

The shelf life of the dye compounds of our invention in solution can be increased by a factor of 3 to 4 times by the addition of an ultra violet absorbent material. 2,4-dihydroxybenzophenone, 2-chloro-4-methoxy-4-hydroxyacetophenone and 2,4 - dihydroxy-4'-methoxybenzophenone, for example, are illustrative, but not limitative, of the ultra violet absorbent materials that can be employed. This is of importance, for example, in connection with the use of the compounds as Q-switches in lasers.

The dye compounds of our invention absorb radiation at unexpectedly longer wavelengths of the spectrum. This property, in addition to their stability to heat and light, render them ideal for uses requiring infrared absorbing dyes such as filters, and especially for those applications, as in filters, requiring high absorbency in the infrared region and high transmittance in the visible region of the spectrum.

Although the invention has been described in considerable detail with particular reference to certain preferred embodiments thereof, variations and modifications can be effected within the spirit and scope of the invention as described hereinbefore, and as defined in the appended claims.

We claim:

1. A pyrylium compound having the formula:

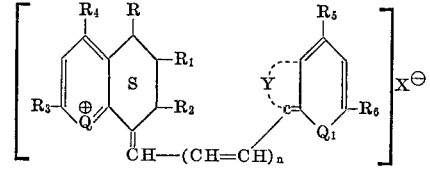

wherein Q and $Q_1$ each represents the same or different member selected from the group consisting of oxygen and sulfur, $n$ represents a whole number selected from 1 and 2, R, $R_1$ and $R_2$ each represents a member selected from the group consisting of hydrogen, an alkyl group having 1 to 4 carbon atoms, an alkoxy group having 1 to 4 carbon atoms and a phenyl nucleus, $R_3$, $R_4$, $R_5$ and $R_6$ each represents a phenyl nucleus, Y represents the necessary atoms to complete a cyclopentenyl or a cyclohexenyl ring and wherein said cyclohexenyl ring can be substituted with an alkyl group having 1 to 4 carbon atoms, an alkoxy group having 1 to 4 carbon atoms, and a phenyl nucleus, $X^\ominus$ represents the anion of a strong acid and S means that the ring in which it appears is saturated and wherein the term a phenyl nucleus represents a member selected from the group consisting of phenyl, chlorophenyl, (low carbon alkyl)phenyl, (low carbon alkoxy) phenyl, a phenyl radical substituted with the amino group and a phenyl radical substituted with the amido group.

2. A compound of claim 1 wherein $n$ is 2.

3. A compound of claim 1 wherein $n$ is 2 and Q and $Q_1$ are oxygen.

4. A compound of claim 1 wherein $X^\ominus$ is $ClO_4^-$.

5. [8-[5-(9,10-dihydro - 11 - benzo[a]xanthene-8-yl)-2,4 - pentadienylidene] - 8,9,10,11 - tetrahydrobenzo[a]xanthylyum$^\oplus$]$X^\ominus$, wherein $X^\ominus$ represents the anion of a strong acid.

6. [8-[5-(6,7-dihydro - 2,4 - diphenyl-5H-1-benzopyran-8-yl) - 2,4 - pentadienylidene]-5,6,7,8-tetrahydro-2,4-diphenyl-1-benzopyrylium$^\oplus$]$X^\ominus$, wherein $X^\ominus$ represents the anion of a strong acid.

7. [8-[5-(6,7-dihydro - 6 - methyl-2,4-diphenyl-5H-1-benzopyran-8-yl)-2,4-pentadienylidene] - 5,6,7,8 - tetrahydro-6-methyl - 2,4 - diphenyl-1-benzopyrylium$^\oplus$]$X^\ominus$, wherein $X^\ominus$ represents the anion of a strong acid.

8. [8-{5-[2,4-di(4-pentyloxyphenyl) - 6,7 - dihydro-5H-benzopyran-8-yl]-2,4-pentadienylidene} - 2,4 - di-(4-pentyloxyphenyl) - 5,6,7,8 - tetrahydro - 1 - benzopyrylium$^\oplus$]$X^\ominus$, wherein $X^\ominus$ represents the anion of a strong acid.

9. [8 - [5 - (6 - cyclohexyl - 6,7 - dihydro - 2,4 - diphenyl - 5H - 1 - benzopyran - 8 - yl) - 2,4 - pentadienylidene] - 6 - cyclohexyl - 5,6,7,8 - tetrahydro - 2,4 - diphenyl - 1 - benzopyrylium$^\oplus$]$X^\ominus$, wherein $X^\ominus$ represents the anion of a strong acid.

10. [8 - [6 - (4,6 - diphenyl - 2H - pyran - 2 - ylidene)-2,4 - hexadienylidene] - 5,6,7,8 - tetrahydro - 2,4 - diphenyl - 1 - benzopyrylium$^\oplus$]$X^\ominus$, wherein $X^\ominus$ represents the anion of a strong acid.

11. [8 - [5 - (6 - tert - butyl - 6,7 - dihydro - 2,4 - diphenyl - 5H - 1 - benzopyran - 8 - yl) - 2,4 - pentadienylidene] - 6 - tert - butyl - 5,6,7,8 - tetrahydro - 2,4 - diphenyl - 1 - benzopyrylium$^\oplus$]$X^\ominus$, wherein $X^\ominus$ represents the anion of a strong acid.

12. [8 - [5 - (5,6 - dihydro - 2,4 - diphenylcyclopenta[b]pyran - 7 - yl) - 2,4 - pentadienylidene]-5,6,7,8 - tetrahydro - 2,4 - diphenyl - 1-benzopyrylium$^\oplus$]$X^\ominus$, wherein $X^\ominus$ represents the anion of a strong acid.

13. [8 - [5 - (6,7 - dihydro - 2,4 - diphenyl - 5H-1 - benzothiopyran - 8 - yl) - 2,4 - pentadienylidene]-5,6,7,8 tetrahydro - 2,4 - diphenyl - 1 - benzothiapyrylium$^\oplus$]$X^\ominus$, wherein $X^\ominus$ represents the anion of a strong acid.

14. [8 - {5 - [2,4 - di(4 - pentyloxyphenyl) - 6,7-dihydro - 5H - 1 - benzopyran - 8 - yl] - 2,4 - pentadienylidene} - 5, 6, 7, 8 - tetrahydro - 2,4 - diphenyl-1 - benzopyrylium$^\oplus$]$X^\ominus$, wherein $X^\ominus$ represents the anion of a strong acid.

15. [8 - [5 - (6,7 - dihydro - 2,4 - diphenyl - 5H-1 - benzopyran - 8 - yl) - 2,4 - pentadienylidene] - 5,6, 7,8 - tetrahydro - 2,4 - diphenyl - 1 - benzothiapyrylium$^\oplus$]$X^\ominus$, wherein $X^\ominus$ represents the anion of a strong acid.

16. [8 - [5 - (6-cyclohexyl-6,7-dihydro - 2,4-diphenyl-5H - 1 - benzopyran - 8-yl)-2,4-pentadienylidene]-2,4-di (4 - pentyloxyphenyl) - 5,6,7,8 - tetrahydro - 1 - benzopyrylium$^\oplus$]$X^\ominus$, wherein $X^\ominus$ represents the anion of a strong acid.

References Cited

UNITED STATES PATENTS 3,337,540  8/1967  Libeer et al. _____ 260—240

JOHN D. RANDOLPH, *Primary Examiner.*

H. I. MOATZ, *Assistant Examiner.*

U.S. Cl. X.R.

331—94.5; 252—300, 62.2; 260—240.7

UNITED STATES PATENT OFFICE
CERTIFICATE OF CORRECTION

Patent No. 3,417,083                                December 17, 1968

George A. Reynolds et al.

It is certified that error appears in the above identified patent and that said Letters Patent are hereby corrected as shown below:

Column 1, before line 10, insert the following:

ABSTRACT OF DISCLOSURE

Novel polymethine pyrylium compounds wherein each end of the polymethine chain containing 3 or 5 carbon atoms is attached to a ring adjacent to the pyrylium ring absorb strongly in the infrared and are stable to light and heat. They are useful, for example, as Q-switches for lasers and in filters. 8-[5-(6,7-dihydro-2,4-diphenyl-5H-1-benzopyran-8-yl)-2,4-pentadienylidene] 5,6,7,8-tetrahydro-2,4-diphenyl-1-benzopyrylium perchlorate and 8-[5-(6,7-dihydro-2,4-diphenyl-5H-1-benzothiopyran-8-yl)-2,4-pentadienylidene]-5,6,7,8-tetrahydro-2,4-diphenyl-1-benzothiapyrylium perchlorate, for example, are illustrative compounds.

Column 2, lines 42 to 49, the extreme right lower portion of the formula reading

          should read          

same column 2, line 64, "apepars" should read -- appears --. Column 3, lines 46 and 47, "glutaconaldehyde" should read -- glutaconaldehyde --; line 65, "illusrtated" should read -- illustrated --. Column 5, lines 40 to 46, lower left portion of the formula reading

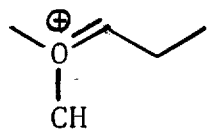          should read          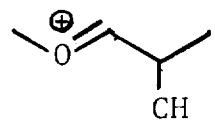

same column 5, line 54, "metling" should read -- melting --. Column 6, line 30, "$C_{67}H_{70}ClO_{10}$" should read -- $C_{67}H_{79}ClO_{10}$ --; line 33, that portion of the formula reading "[2,4-di)4-" should read -- [2,4-di(4- --. Column 7, lines 26 and 27, after "-pentadienylidene]-" insert -- 5,6,7,8-tetrahydro-2,4-diphenyl-1-benzothia- --; lines 28 to 35, lower right portion of the formula reading

          should read          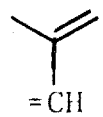

3,417,083

(2)

same column 7, line 47, "$C_{21}H_{10}ClO_4S$:" should read -- $C_{21}H_{19}ClO_4S$: --. Column 8, lines 16 to 24, the right-hand portion of the left-hand part of the formula reading

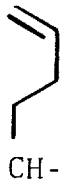     should read     

Column 10, line 23, "charge" should read -- change --. Column 11, line 12, "-11-" should read -- -11H- --.

Signed and sealed this 21st day of April 1970.

(SEAL)
Attest:

EDWARD M. FLETCHER, JR.
Attesting Officer

WILLIAM E. SCHUYLER, JR.
Commissioner of Patents